(12) United States Patent
Tang

(10) Patent No.: US 7,477,702 B2
(45) Date of Patent: Jan. 13, 2009

(54) APPARATUS, AND ASSOCIATED METHOD, FOR SELECTING A SWITCHING THRESHOLD FOR A TRANSMITTER UTILIZING ADAPTIVE MODULATION TECHNIQUES

(75) Inventor: Clive Tang, Irving, TX (US)

(73) Assignee: Nokia Mobile Phones Limited, Espoo (FI)

( * ) Notice: Subject to any disclaimer, the term of this patent is extended or adjusted under 35 U.S.C. 154(b) by 1449 days.

(21) Appl. No.: 09/901,988

(22) Filed: Jul. 10, 2001

(65) Prior Publication Data

US 2002/0072885 A1 Jun. 13, 2002

Related U.S. Application Data

(63) Continuation-in-part of application No. 09/751,640, filed on Dec. 29, 2000.

(60) Provisional application No. 60/250,242, filed on Nov. 30, 2000.

(51) Int. Cl.
*H04K 1/02* (2006.01)

(52) U.S. Cl. .................. 375/296; 375/219; 370/252; 455/69

(58) Field of Classification Search .......... 375/261, 375/298, 223, 264, 130, 262, 227, 222, 219, 375/267, 299, 347, 295, 296; 455/452.2, 455/452.1, 67.13, 67.11, 522, 23, 42, 226.3, 455/69, 101, 102, 272, 691; 370/401, 252, 370/477, 389, 465, 324, 347; 332/103
See application file for complete search history.

(56) References Cited

U.S. PATENT DOCUMENTS

| | | | | |
|---|---|---|---|---|
| 5,491,727 A | * | 2/1996 | Petit | 375/358 |
| 5,699,365 A | | 12/1997 | Klayman et al. | 371/5.5 |
| 6,108,374 A | * | 8/2000 | Balachandran et al. | 375/227 |
| 6,198,734 B1 | * | 3/2001 | Edwards et al. | 370/347 |
| 6,298,092 B1 | * | 10/2001 | Heath et al. | 375/267 |
| 6,330,278 B1 | * | 12/2001 | Masters et al. | 375/223 |
| 6,359,934 B1 | * | 3/2002 | Yoshida | 375/262 |
| 6,452,964 B1 | * | 9/2002 | Yoshida | 375/222 |

(Continued)

FOREIGN PATENT DOCUMENTS

EP 0 260 470 3/1988

(Continued)

OTHER PUBLICATIONS

Channel quality estimation and rate adaptation for cellular mobile radio; Balachandran, K. et al; Selected Areas in Communications, IEEE Journal on vol. 17, Issue 7, Jul. 1999 pp. 1244-1256.*

(Continued)

*Primary Examiner*—Temesghen Ghebretinsae
(74) *Attorney, Agent, or Firm*—Squire, Sanders & Dempsey, LLP (57) ABSTRACT

Apparatus, and an associated method selects an adaptive switching threshold level responsive to a constrained optimization scheme. The switching level is selected by an LRI function forming a portion of a transmitting station, such as a base transceiver station operable in a cellular communication system. The switching threshold level is utilized in the selection by an adaptive modulator of a modulation parameter by which data transmitted by the transmitting station is encoded or modulated.

25 Claims, 3 Drawing Sheets

U.S. PATENT DOCUMENTS

| | | | |
|---|---|---|---|
| 6,498,510 B2* | 12/2002 | Warner | 326/81 |
| 6,714,551 B1* | 3/2004 | Le-Ngoc | 370/401 |
| 6,865,393 B1* | 3/2005 | Baum et al. | 455/452.2 |
| 2002/0102940 A1* | 8/2002 | Bohnke et al. | 455/23 |
| 2003/0002495 A1* | 1/2003 | Shahar et al. | 370/389 |

FOREIGN PATENT DOCUMENTS

| | | |
|---|---|---|
| EP | 0 845 916 | 6/1998 |
| EP | 0 963 074 A2 | 12/1999 |
| WO | WO 99/12302 | 3/1999 |
| WO | WO 00/76109 | 12/2000 |

OTHER PUBLICATIONS

Adaptive coded modulation over slow frequency-selective fading channels; Viswanathan, H. et al; Vehicular Technology Conference, 1999 IEEE 49th vol. 3, May 16-20, 1999 pp. 2388-2392 vol. 3.*

Adaptive multicarrier modulation: a convenient framework for time-frequency processing in wireless communications Keller, T. et al; Proceedings of the IEEEvol. 88, Issue 5, May 2000 pp. 611-640.*

Theoretical study of link adaptation algorithms for adaptive modulation in wireless mobile communication systems Yuping Zhao;Universal Personal Communications, 1998. ICUPC '98. IEEE 1998 International Conference on vol. 1, Oct. 5-9, 1998 p. 587-5.*

Chandramouli. R.. et al.; "Rate Control for a Video Coder Using Learning Automata"; 1998 IEEE: Center for Microelectronics Research Department of Computer Science and Engg. University of South Florida. Tampa: Department of ECE. The University of Texas at El Paso. El Paso. Texas: pp. 4630-4635.

Lau. Vincent K.N.,: "Performance of Variable Rate Bit Interleaved Coding for High Bandwidth"; XP-000968365: 2000 IEEE; Department of Electrical and Electronic Engineering. University of Hong Kong: Aug. 13, 1999: pp. 2054-2058.

* cited by examiner

APPARATUS, AND ASSOCIATED METHOD, FOR SELECTING A SWITCHING THRESHOLD FOR A TRANSMITTER UTILIZING ADAPTIVE MODULATION TECHNIQUES

CROSS-REFERENCE TO RELATED APPLICATIONS

This application is a Continuation-in-Part to co-pending U.S. application Ser. No. 09/751,640, filed on Dec. 29, 2000, and claims benefit of Provisional Application Ser. No. 60/250,242, filed on Nov. 30, 2000, assigned to assignee of present application and incorporated herein by reference.

The present invention relates generally to a manner by which to select a modulation parameter at a sending station, such as the transmit portion of a base transceiver station or mobile station operable in a cellular communication system, which uses adaptive modulation techniques. More particularly, the present invention relates to apparatus, and an associated method, for dynamically selecting a switching threshold used in the selection of the modulation parameter. The switching threshold is selected responsive to a constrained optimization scheme in which two, or more, communication characteristics defining performance criteria are used in the selection of the switching threshold. Selection is made, for example, to optimize one of the communication characteristics while also ensuring that at least one additional communication characteristic is at least fulfilled, i.e., of an acceptable level. By dynamically selecting the switching threshold upon two or more performance criteria, improved quality levels of communication are possible as additional performance criteria are used in the selection of the switching threshold and, hence, determination of the modulation parameter which is used.

BACKGROUND OF THE INVENTION

The use of wireless communication systems through which to communicate has achieved wide popularity in recent years. In a wireless communication system, a radio link is utilized upon which to form a communication path between a sending station and a receiving station. In contrast to a conventional, wireline communication system which requires fixed, wired connections to be maintained between the sending and receiving stations, use of a wireless communication system inherently permits increased mobility of communication. Additionally, infrastructure costs associated with a wireless communication system are generally less than the corresponding costs associated with the infrastructure of a conventional, wireline communication system. Installation of a wireless communication system is therefore generally less costly than the costs associated with installation of a wireline communication system.

Multi-user, wireless communication systems permit relatively large numbers of users simultaneously to communicate by way of such systems. A cellular communication system is exemplary of a wireless, multi-user, radio communication system which has been installed over significant geographical areas and which has achieved wide levels of usage.

A cellular communication system makes relatively efficient use of the portion of the electromagnetic spectrum allocated thereto upon which to define communication channels. The infrastructure of a cellular communication system includes a plurality of fixed-site base stations which are installed at spaced-apart locations throughout a geographical area. Because of the positioning of the base stations, only relatively low power signals are needed to be transmitted to effectuate communications with a mobile station. By transmitting relatively low-power signals, the same frequencies can be reused at different locations throughout the geographical area in which the network infrastructure installed. Communications can be effectuated between more than one set of sending and receiving stations concurrently at separate locations throughout the area encompassed by the cellular communication system.

In an ideal communication system, data, communicated by the sending station, is communicated distortion-free upon a communication channel to the receiving station. When the data is received at the receiving station, the data is substantially identical in value to the corresponding data when transmitted by the sending station. However, in a non ideal communication system in which the data is communicated upon a non ideal communication channel, the data, when received at the receiving station, is dissimilar to the corresponding values of the data when sent by the sending station. Distortion of the data caused by transmission of the data upon the non ideal communication channel causes such dissimilarities to result. If the distortion is significant, the informational content of the signal cannot be recovered at the receiving station.

The communication channel might be of characteristics which distort the value of the information bearing bits forming the data which is communicated upon the communication channel to the receiving station. Fading, such as that caused by multi-path transmission or Rayleigh fading, alters the data during its transmission. Such distortion, if not corrected, reduces the communication quality levels in a communication session formed between the sending and the receiving stations.

Various techniques are utilized to overcome distortion introduced upon the data as a result of transmission upon a non ideal communication channel.

Time-encoding of the data, prior to its transmission, for instance, increases the redundancy of the transmitted data. By increasing the time redundancy of the data, the likelihood of the informational content of the data being recoverable, once received at the receiving station, is increased. Increasing the time redundancy of the data is sometimes referred to as creating time diversity.

Adaptive modulation is also sometimes utilized. In an adaptive modulation technique, the manner by which the data is modulated is selected responsive to the channel conditions of the communication channel upon which the data is to be communicated. That is to say, the modulation scheme utilized by which to modulate the data is selected according to the channel conditions. High-order modulations are utilized with little, or no, coding when the channel conditions are good. Conversely, low-order modulation schemes with maximum coding are utilized when the channel conditions are poor. Determination of the channel conditions are made through, for instance, evaluation of measured signal-to-noise ratios (SNRs).

The range of possible values of the SNR is partitioned into a number of fading regions. A specific modulation scheme or a specific coding scheme, or a combination of both, is assigned to each region. Selection of the boundaries between regions is important as the boundaries define which modulation and/or coding schemes are utilized to overcome the non ideal channel conditions. The region boundaries shall herein be referred to as switching thresholds as switching between modulation parameters such as the modulation-type and coding-type switch at such boundaries.

In the aforementioned co-pending patent application of Ser. No. 09/751,640, an artificial intelligence learning scheme is utilized to optimize the switching thresholds so as to maximize the data throughput (TP) of the communication of the data from the sending station to the receiving station. With further communication of the data, the long-term data throughput is continuously monitored and values derived therefrom are used as a referee to train the artificial intelligence learning scheme. A manner is thereby disclosed by which to facilitate maximization of data throughput upon a non ideal communication channel.

The use of additional performance criteria, in addition to data throughput, might additionally be utilized in the selection of switching thresholds.

It is in light of this background information related to communication systems which utilize adaptive modulation schemes that the significant improvements of the present invention have evolved.

SUMMARY OF THE INVENTION

The present invention, accordingly, advantageously provides apparatus, and an associated method, by which to facilitate selection of a modulation parameter by which to operate upon data to be communicated by a sending station which utilizes adaptive modulation techniques.

Through operation of an embodiment of the present invention, dynamic selection of a switching threshold is performed. The switching threshold is used to end the selection of the modulation parameter as the switching threshold defines the boundaries between regions at which different modulation parameters are utilized.

The switching threshold is selected responsive to a constrained optimization scheme in which two, or more, performance criteria defined of communication characteristics are used in the selection of the switching threshold. Selection is made, e.g., to optimize one of the communication characteristics while also ensuring that at least one additional communication characteristic is at least fulfilled.

Dynamic selection of the switching threshold permits corresponding dynamic selection of a modulation parameter by which to operate upon data pursuant to an adaptive modulation technique. Improved quality of communications is facilitated as a result of the dynamic selection process. And, as the switching threshold is selected responsive to satisfaction of multiple performance criteria, a constrained optimization criteria facilitates further improved communication quality levels of communications.

Quality of service levels are, of course, dependent upon many criteria, and satisfaction of additional performance criteria are often needed in order to satisfy a particular quality of service level.

Implementation of an embodiment of the present invention utilizes, for instance, stochastic computing elements, formed of basic logic gates. Other synthesis automata can alternately be utilized. Implementation is effectuated at a transmitter as part of an adaptive modulation selector.

In another aspect of the present invention, the constrained optimization of the performance criteria optimizes throughput (TP) while maintaining an error rate indicia within an allowable level. As the throughput and error rate indicia changes, the constrained optimization scheme results in alteration of the threshold level used to select the modulation parameter upon which data is operated.

In another aspect of the present invention, an enhanced linear-reward-inaction (LRI) learning algorithm is provided and used to provide an adaptive switching threshold to be used in the selection of a modulation parameter, such as a modulation-type or an encoding complexity level. The enhanced LRI learning algorithm is coupled to receive indicia representative of an error rate indicia and a throughput indicia and utilizes such values as a joint referee for the enhanced LRI learning algorithm.

More than one adaptive switching thresholds are determinable. Each of the separate switching thresholds defines a boundary region defining different modulation parameters. Thereby, an adaptive modulation scheme can utilize, selectably, several different modulation parameters depending upon communication characteristics of a communication channel upon which data is to be communicated. When communication conditions worsen, the modulation parameter is selectably changed so that the data is better able to be communicated upon the communication channel in a manner to permit its subsequent recovery at a receiving station which receives the communicated data. Conversely, when the communication conditions upon the communication channel improve, the modulation parameters are selectably altered, responsive to positioning upon one, or the other, side of a switching threshold, thereby to improve the rate at which the data is communicated. Because the switching thresholds are adaptively selected responsive to communication characteristics of the communication channel, as communication conditions change, the switching threshold is adaptively altered, thereby to permit redefinition of the region boundaries.

In another aspect of the present invention, signal-to-noise ratios (SNRs) of data communicated upon a communication channel are determined, and the switching thresholds are defined in terms of SNR values. Adaptive alteration of the switching threshold is made responsive to the evaluation of the constrained optimization parameters. As indicated SNR values change, the modulation parameter is correspondingly changed. Thereby, as the communication characteristics, indicated by the measured SNR values, change, the complexities of the operations performed upon the data are selectively altered.

In one implementation, a manner is provided by which to facilitate selection of a switching threshold used pursuant to operation of an adaptive modulation selector of a base transceiver station operable in a cellular communication system. Implementation is permitted, e.g., in any of various, proposed 3G (Third Generation), such as a CDMA 2000 system which provides for 1XTREME data communications. The selected threshold level is adaptively determined, defined in terms of an SNR value. Two, or more, communication characteristics defining performance criteria are utilized in the determination of the switching threshold level. Constrained optimization is performed by which to maximize throughput while maintaining a frame error rate (FER) within a permissible level. The throughput and FER values are feedback, or other measured, values. Thereby, the level of the switching threshold determined responsive to the constrained optimization evaluation is dynamically determinable. Subsequent selection of the modulation parameter to be utilized by which to operate upon the data to be communicated is thereby better selectable responsive to actual communication performance.

In these and other aspects, therefore, apparatus, and an associated method, is provided for a communication system having a first communication station operable to transmit data upon a communication channel susceptible to fading. Dynamic selection of at least a first switching threshold used in selection of a modulation parameter is made. A calculator is coupled to receive indications of a selected communication indicia associated with communication characteristics of the communication channel during a selected interval. The calculator selects the at least the first switching threshold. The first switching threshold is selected by the calculator to at least satisfy a first performance criteria and also to satisfy at least a second performance criteria.

A more complete appreciation of the present invention and the scope thereof can be obtained from the accompanying drawings which are briefly summarized below, the detailed description of the presently preferred embodiments of the invention, and the appended claims.

DETAILED DESCRIPTION

Figure 1:
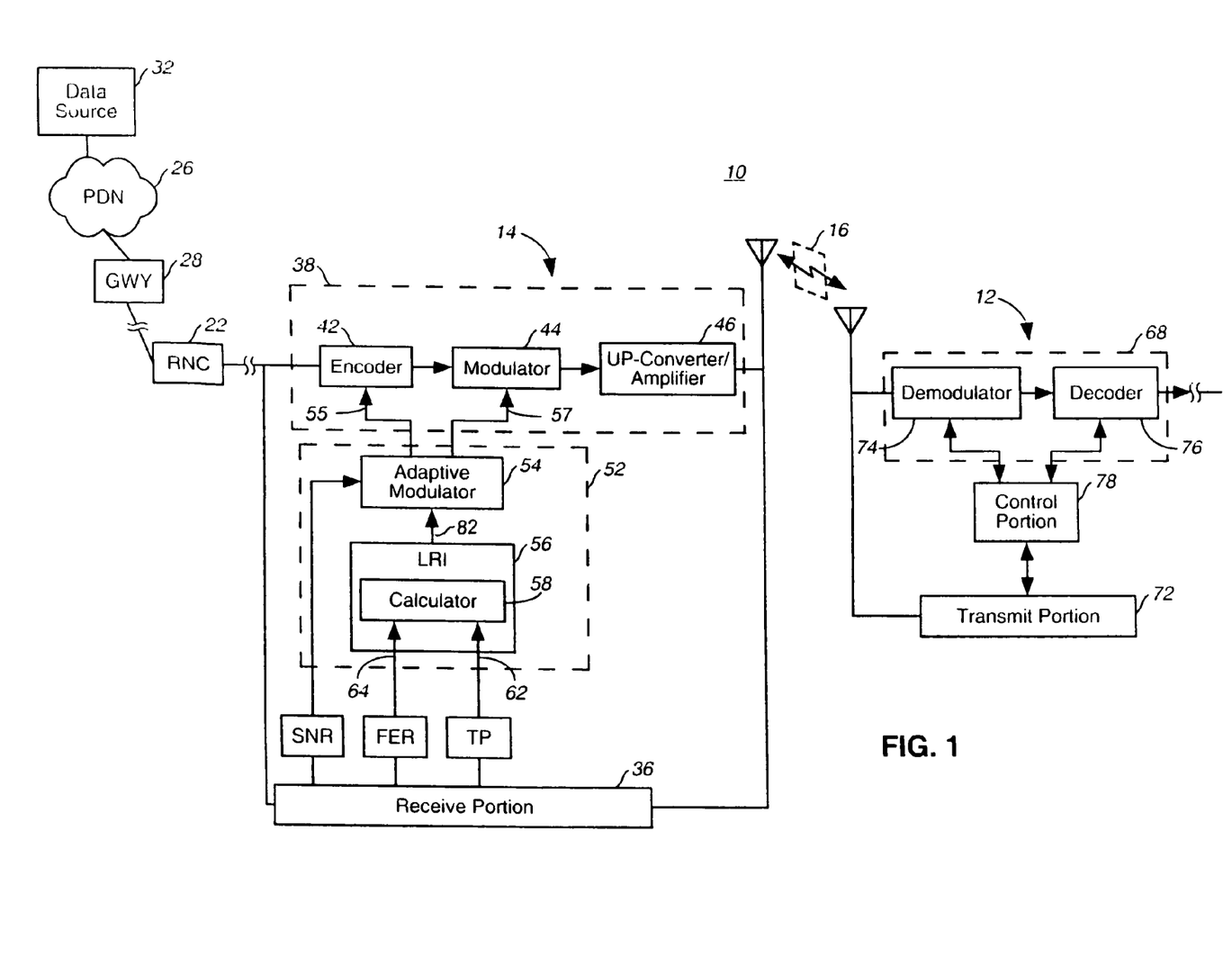
FIG. 1 illustrates a functional block diagram of a communication system in which an embodiment of the present invention is operable.

Referring first to FIG. 1, a communication system, shown generally at 10, provides for radio communications with a mobile station, such as the mobile station 12. In the exemplary implementation, the communication system is representative of any of various, proposed 3G (Third Generation) cellular communication systems, such as a CDMA2000 system which provides for 1XTREME data communications. The communication system is also representative of any of many other types of communication systems. While the following description shall describe operation of the communication system 10 with respect to its exemplary implementation as a 3G cellular communication system, in other implementations, operation of an embodiment of the present invention can analogously be described with respect to its implementation in another type of communication system. And, while operation of an embodiment of the present invention is described with respect to communications in a downlink direction, i.e., to the mobile station, operation of an embodiment of the present invention is analogously also operable in an uplink direction, i.e., from the mobile station.

The communication system includes a network portion here including a base transceiver station 14. The base transceiver station communicates with the mobile station by way of a radio link upon which one or more communication channels are defined. The radio link exhibits non-ideal communication characteristics, such as fading characteristics caused by multi path propagation and Rayleigh fading. The characteristics of the channel are time-dependent. That is, the characteristics of the channel defined upon the radio link changes as a function of time, and the fading, or other, characteristics of the channel are time-varying.

The base transceiver station 14 forms a portion of the radio access network of the communication system. The radio access network includes other functional entities, here including a radio network controller (RNC) 22.

The radio access network is, in turn, coupled to a packet data network (PDN) 26, such as the Internet backbone, by way of a gateway (GWY) 28. A correspondent device, here represented by a data source 32 is connected to the packet data network, and a communication path is formable between the correspondent device and the mobile station by way of the network portion of the communication system and the radio link 16. In the exemplary implementation, the data communicated with the communication station is frame-formatted, and communication of the data is effectuated by communicating successive frames between the correspondent device formed of the data source and the mobile station.

The base transceiver station 14 includes a receive portion 36 and a transmit portion 38. The transmit portion is here shown to include an encoder 42, a modulator 44, and an up-converter/amplifier 46. Data to be communicated by the base transceiver station upon the radio link 16 is encoded by the encoder at a selected encoding rate, and the encoded data is modulated by the modulator by a selected modulation technique. Thereafter, the encoded and modulated data is up-converted and amplified by the up-converter and amplifier and provided to an antenna transducer 48 to be transduced thereat and communicated by way of the radio link to the mobile station. Data communicated by the base transceiver station to the mobile station is referred to as being generated in the downlink direction, and data originated at the mobile station and transmitted to the base transceiver station is referred to as being transmitted in the reverse link direction. Reverse-link data sent by the mobile station to the base transceiver station is detected at the antenna transducer 48, transduced into electrical form and provided to the receive portion 36 to be operated upon thereat.

The base transceiver station 14 also includes a control portion 52. The control portion is coupled to both the receive and transmit portions of the base transceiver station. The control portion includes an adaptive modulator 54 which selects one or more modulation parameters determinative of the manner by which the transmit portion 38 of the base transceiver station operates upon the data which is to be transmitted therefrom. The lines 56 and 58 extending to the encoder and to the modulator, respectively, are representative of indications of selected encoding rates and indications of selected modulation-types by which the encoder and modulator, respectively, are selected by the adaptive modulator to be operable.

The control portion 52 further includes an enhanced linear-reward-inaction (LRI) learning algorithm element 56 operable to perform calculations, indicated by the calculation function 58 pursuant to an embodiment of the present invention. The enhanced LRI function is coupled to receive inputs, here an indication of a data throughput (TP) on the line 62 and an indication of the frame error rate (FER) on the line 64. The TP and FER values are representative of measured, or calculated, communication characteristics of the communication of data upon the radio link 16. Here, the lines 62 and 64 extend from the receive portion 36 as the TP and FER values are determined at, or provided responsive to information supplied by, the mobile station 12.

The mobile station 12 also includes receive and transmit portions, here designated by the portions 68 and 72. The receive portion 68 is shown also to include a demodulator 74 and a decoder 76. A control portion 78 is coupled between the receive and transmit portions 68 and 72. When data frames are received at the mobile station, the control portion, amongst other things, operates to determine the number of frames which are in error. Such determinations are made, for instance, through CRC (cyclic redundancy check) evaluations. Throughput is also determinable by the control portion. Determinations made by the control portion are provided to the transmit portion and returned by way of a reverse link communication to the base transceiver station.

When detected by the receive portion 36 of the base transceiver station, such information is extracted and provided to the enhanced LRI function 56. Calculations are performed by the calculator 58 to determine a switching threshold value. In one implementation, several switching threshold levels are calculated. The switching level thresholds are calculated according to a constrained optimization scheme. In the exemplary implementation, the constrained optimization scheme selects a switching threshold level to maximize throughput while maintaining the frame error rate with selected levels. As the values of TP and FER change, the value of the switching threshold level also changes in conformity with compliance with the constrained optimization scheme. Thereby, the switching threshold level is adaptively determined.

Indications of the selected switching threshold levels are provided to the adaptive modulator, here by way of the line 82. The adaptive modulator makes use of the switching threshold level to determine the modulation parameter, or parameters, generated on the lines 55 and 57. As the switching threshold level is adaptively alterable, the modulation parameters selected by the adaptive modulator correspondingly are adaptively alterable. Thereby, depending upon the communication conditions upon the radio link 16, the modulation parameters are better selected to facilitate the best level of communications, i.e., the highest throughput levels while maintaining frame error rates within acceptable levels.

The adaptive modulator 54 is coupled to receive indications of an SNR value, here applied by way of the line 84. The SNR value is compared together with the switching threshold level and, responsive to the comparison, the adaptive modulator selects the modulation parameters to be used by the transmit portion 38 of the base transceiver station.

Figure 2:
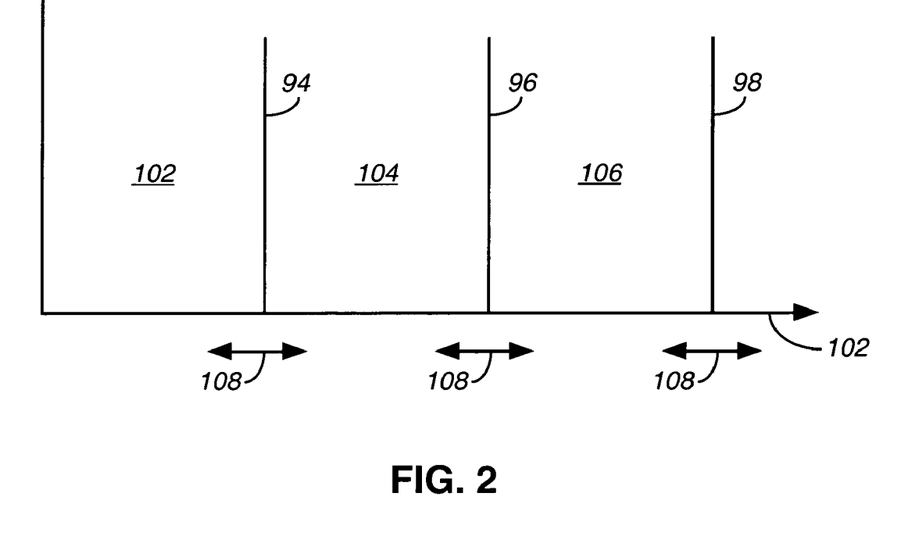
FIG. 2 illustrates a graphical representation of several exemplary, adaptive switching thresholds selected during operation of an embodiment of the present invention and utilized in the selection of a modulation parameter at the communication station forming a portion of the communication system shown in FIG. 1.

FIG. 2 illustrates a graphical representation, shown generally at 92 representative of exemplary operation of the enhanced LRI function and adaptive modulator forming a portion of the communication system shown in FIG. 1. Here, three switching threshold levels, switching threshold level 94, switching threshold level 96, and switching threshold level 98, are plotted along an SNR axis 102. The switching threshold levels define separate regions, here regions 102, 104, and 106 bounded by the switching threshold levels. Each of the regions 102, 104, and 106 have associated therewith modulation parameters. When an SNR value is applied to the adaptive modulator by way of the line 84 (shown in FIG. 1), the region associated with the SNR value is determinative of the modulation parameter by which the data is operated upon by the transmit portion of the base transceiver station.

Arrows 108 positioned beneath the switching threshold levels 94, 96, and 98 are representative of the adaptive nature of the switching thresholds. As the switching thresholds are determined responsive to a constrained optimization scheme, the values of the switching threshold levels are correspondingly altered together with changes in the parameters which define the constrained optimization scheme. By changing the values of the switching threshold levels, the boundaries which define respective ones of the regions 102, 104, and 106 are correspondingly altered. As the adaptive modulator 54 (shown in FIG. 1) selects modulation parameters responsive to in which region that the SNR value of data communicated upon the communication channel falls, the modulation parameters selected by the adaptive modulator are also dependent upon the defined regions, as set by the switching threshold levels.

Figure 3:
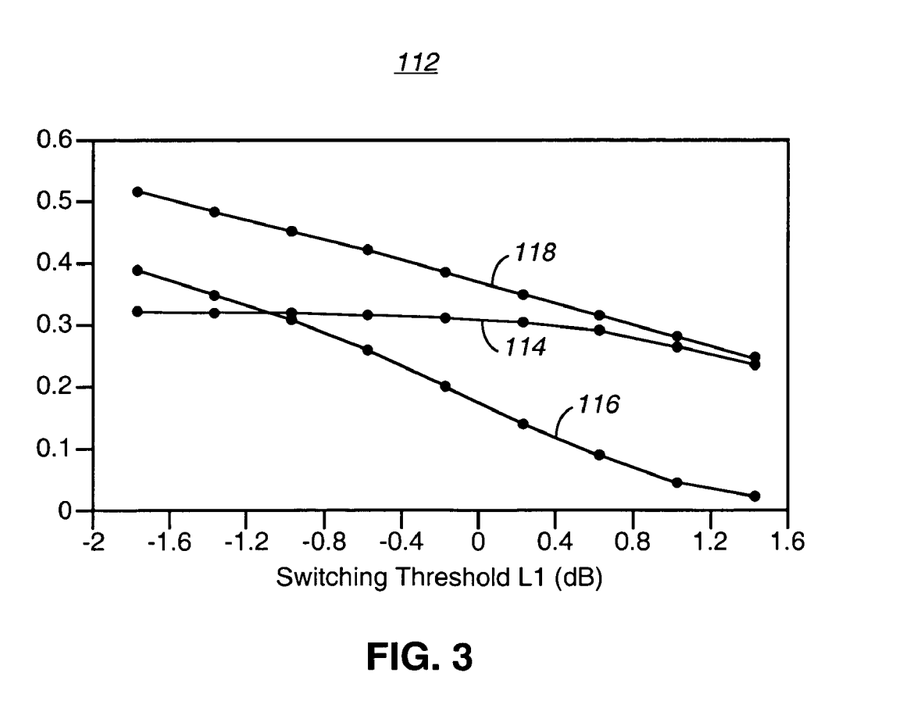
FIG. 3 illustrates a graphical representation of exemplary throughput (TP), frame error rate (FER) and frames per burst (FPB) values plotted as functions of an exemplary switching threshold.

FIG. 3 illustrates a graphical representation, shown generally at 112, representative of the relationship between a data throughput (TP) rate and a switching threshold level. Here, normalized values of the throughput are plotted as a function of a switching threshold level value to form the curve 114, normalized frame error rates are plotted as a function of the switching threshold value to form the curve 116, and normalized values of frames per burst are plotted as a function of switching threshold levels to form the curve 118. The throughput is defined as: TP=(1−FER)*FPB.

Analysis of the curves 114, 116, and 118 indicates that the respective TP, FER, and FPB values are dependent upon the level of the switching threshold. That is to say, as the level of the switching threshold changes, i.e., is adaptively altered responsive to maintenance of a constrained optimization scheme, the resulting values of TP, FER, and FPB change.

For instance, when the level of the switching threshold is low, large values of FER are exhibited. And, as the level of the switching threshold increases, the value of the FER decreases.

In exemplary implementation, the encoder 42 of the transmit portion 38 of the base transceiver station shown in FIG. 1 exhibits a constraint length of K=9 and an encoding rate R=½. A data frame communicated by the base transceiver station is of a 184 bit length, adding eight tailing bits such that an encoded frame is of a 384 symbol length. The modulator 44 in the exemplary implementation modulates the encoded data applied thereto using either QPSK, 16 QAM, or 64 QAM modulation techniques. Hence, during a frame burst, either one, two, three frames of data are sent upon the radio link, depending upon which of the modulation schemes are utilized.

The adaptive modulator 54 monitors instantaneous fading channel gain of the radio link 16 at the beginning of each frame burst and also the number of error frames in a preceding burst. The number of error frames in the preceding burst is used in conjunction with the number of frames transmitted to estimate the frame error rate, the frames transmitted per burst, and the throughput. The modulator 54 selects the appropriate modulation scheme in a frame burst-by-frame burst basis according to the instantaneous channel gain, so as to maximize the long term average TP subject to a target FER limit.

Further, with respect to the switching threshold levels selected by the enhanced LRI function, three switching threshold levels are determined. The switching threshold levels define, therefore, a first region 102 extending between no transmission to QPSK modulation, a second region 104 extending between QPSK and 16 QAM modulation, and a third region 106 defining 16 QAM modulation to 64 QAM modulation. In contrast to a conventional adaptive modulation controller, the switching threshold levels 94, 96, and 98 are here adaptively altered pursuant to the constrained optimization scheme. The enhanced LRI function provides a self-learning manner by which to select the switching threshold levels which does not utilize expressions of throughput and the thresholds, nor does the manner make assumptions with respect to the operating environment of the communications. A class of learning techniques, namely, stochastic learning automata, is utilized.

In this approach, an automaton output is regarded as a set of switching threshold levels. That is, the thresholds are partitioned into a number of combinations, and the number of combinations are equal to the number of automaton output actions. The task of the automaton is to choose an action which gives a best performance function. The environment represents the operating environment of the modulation selector. The automaton uses a learning algorithm to update the output probability vector to govern a choice of switching thresholds. An LRI algorithm function successfully converges to the best action that gives the maximum TP. A manner is provided by which to estimate the FER, FPB, and TP values for the purposes of training up the automaton. And, an enhanced LRI function is provided which accepts a joint referee and performs optimization under a constraint.

Figure 4:
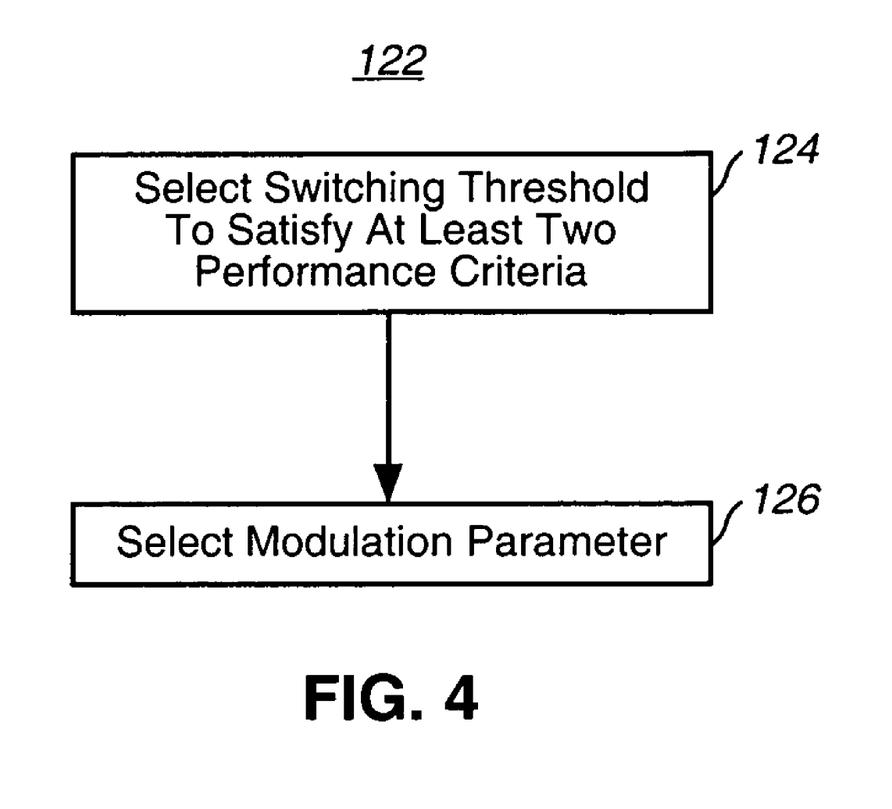
FIG. 4 illustrates a method flow diagram listing the method steps of the method of operation of an embodiment of the present invention.

FIG. 4 illustrates a method, shown generally at 122 representative of the method of operation of the method of an embodiment of the present invention. The method dynamically selects at least a first switching threshold used in selection of a modulation parameter.

First, and as indicated by the block 124, at least a first switching threshold is selected responsive to indications of a selected communication indicia associated with communication characteristics of a communication channel during a selected interval. The switching threshold is selected to at least satisfy a first performance criteria and to satisfy at least a second performance criteria. Then, and as indicated by the block 126, the modulation parameter is selected by which the data is operated upon by the first communication station prior to transmission upon the communication channel.

Thereby, a manner is provided by which to select a threshold level responsive to a constrained optimization scheme and, thereafter, select a modulation parameter responsive to values of the selected threshold level.

The previous descriptions are of preferred examples for implementing the invention, and the scope of the invention should not necessarily be limited by this description. The scope of the present invention is defined by the following claims.

What is claimed:

1. An apparatus comprising:
a calculator coupled to receive indications of a selected communication indicia associated with communication characteristics of a communication channel during a selected interval, the apparatus being configured to transmit data upon the communication channel and to dynamically select at least a first switching threshold used in selection of a modulation parameter, said calculator being configured to select the at least the first switching threshold, the first switching threshold changeable responsive to changes in the selected communication indicia, and the first switching threshold selected by said calculator to at least satisfy a first performance criteria and to satisfy at least a second performance criteria.

2. The apparatus of claim 1, wherein selection of the first switching threshold by said calculator maximizes the first performance criteria while also satisfying the at least the second performance criteria.

3. The apparatus of claim 1, wherein the selected communication indicia to which said calculator is coupled to receive indications thereof comprises error indicia representative of errors introduced upon the data during communication upon the communication channel.

4. The apparatus of claim 3, wherein the data comprises frame-formatted data and wherein the error indicia to which said calculator is coupled to receive comprises a frame error rate indication.

5. The apparatus of claim 1, wherein the data transmitted by the first communication station is transmitted to a second communication station, wherein the second communication station is coupled in a feedback arrangement with the first communication to return to the first communication station a report representative of the communication characteristics of the communication channel, and wherein the selected communication indicia to which said calculator is coupled to receive is based upon the report returned to the first communication station.

6. The apparatus of claim 5, wherein the data transmitted by the first communication station is formatted into a plurality of data frames which are successively transmitted upon the communication channel, the plurality including a previously-transmitted data frame and a subsequent data frame, the report returned to the first communication station subsequent to reception of the previously-transmitted frame and wherein the first switching threshold selected by said calculator is selected, and the modulation parameter selected therefrom is selected, prior to transmission of the subsequent data frame by the first communication station.

7. The apparatus of claim 6, wherein the selected communication indicia to which said calculator is coupled to receive indications thereof comprises throughput indicia representative of a throughput rate at which the plurality of data frames are transmitted on the communication channel.

8. The apparatus of claim 7, wherein the selected communication indicia to which said calculator is coupled to receive indications thereof further comprises a frame error rate indication, the throughput rate being negatively related to the frame error rate indication.

9. The apparatus of claim 1, further comprising a modulation parameter selector coupled to said calculator, said modulation parameter selector for selecting the modulation parameter by which the data is operated upon by the first communication station prior to transmission upon the communication channel.

10. The apparatus of claim 9, wherein the modulation parameter comprises a modulation-type by which the data is modulated by the first communication station.

11. The apparatus of claim 9, wherein the modulation parameter comprises an encoding rate by which the data is encoded by the first communication station.

12. The apparatus of claim 1, wherein said calculator comprises a processor having an enhanced linear-reward-inaction learning algorithm executable thereat and in which the selected communication indicia form inputs to the linear-reward-inaction algorithm.

13. A processor embodied on a computer readable medium, the processor having a linear-reward-inaction learning algorithm executable thereat for:
receiving indications of a selected communication indicia associated with communication characteristics of a communication channel during a selected interval, the processor being in an apparatus for a first communication station being operable to transmit data upon the communication channel and to dynamically select at least a first switching threshold used in selection of a modulation parameter, and
selecting the at least the first switching threshold, the first switching threshold selected by said linear-reward-inaction learning algorithm to at least satisfy a first performance criteria and to satisfy at least a second performance criteria.

14. The processor of claim 13, wherein inputs formed of the selected communication indicia comprise teaching inputs to the linear-reward-inaction.

15. The processor of claim 14, wherein the teaching inputs comprise an indication related to the first performance criteria and an indication related to the second performance criteria.

16. A method comprising:
selecting at least a first switching threshold responsive to indications of a selected communication indicia associated with communication characteristics of a communication channel during a selected interval, the first switching threshold selected to at least satisfy a first performance criteria and to satisfy at least a second performance criteria;

selecting the modulation parameter by which the data is operated upon by the first communication station prior to transmission upon the communication channel;

changing the at least the first switching threshold responsive to changes in the indications of the selected communication indicia; and selectably changing the modulation parameter responsive to changes in the at least the first switching threshold.

17. The method of claim 16, comprising maximizing the first performance criteria while also satisfying the at least the second performance criteria, by the first switching threshold selected during said operation of selecting the at least the first switching threshold.

18. The method of claim 16, comprising:

performing selecting the at least the first switching threshold by executing an algorithm at a processor, wherein the first communication station comprises the processor.

19. The method of claim 18, wherein the algorithm comprises a enhanced linear-reward-inaction learning algorithm in which the selected communication indicia form inputs to the linear-reward-inaction algorithm.

20. The method of claim 19, wherein the inputs to the linear-reward-inaction algorithm comprise a first indication related to the first performance criteria and a second indication related to the second performance criteria.

21. An apparatus comprising:

selecting means for selecting the at least a first switching threshold responsive to indications of a selected communication indicia associated with communication characteristics of a communication channel during a selected interval, the first switching threshold selected to at least satisfy a first performance criteria and to satisfy at least a second performance criteria; and selecting means for selecting the modulation parameter by which the data is operated upon by the first communication station prior to transmission upon the communication channel;

changing means for changing the at least the first switching threshold responsive to changes in the indications of the selected communication indicia; and means for selectably changing the modulation parameter responsive to changes in the at least the first switching threshold.

22. An apparatus comprising:

a first selector configured to select the at least a first switching threshold responsive to indications of a selected communication indicia associated with communication characteristics of a communication channel during a selected interval, the first switching threshold selected to at least satisfy a first performance criteria and to satisfy at least a second performance criteria; and a second selector configured to select the modulation parameter by which the data is operated upon by the first communication station prior to transmission upon the communication channel;

a first changer configured to change the at least the first switching threshold responsive to changes in the indications of the selected communication indicia; and a second changer configured selectably changing the modulation parameter responsive to changes in the at least the first switching threshold.

23. An apparatus comprising:

a calculator coupled to receive indications of a selected communication indicia associated with communication characteristics of a communication channel during a selected interval, the apparatus being configured to transmit data upon the communication channel and to dynamically select at least a first switching threshold used in selection of a modulation parameter, said calculator being configured to select the at least the first switching threshold, the first switching threshold changeable responsive to changes in the selected communication indicia, and the first switching threshold selected by said calculator to at least satisfy a first performance criteria and to satisfy at least a second performance criteria, wherein said calculator comprises a processor having an enhanced linear-reward-inaction learning algorithm executable thereat and in which the selected communication indicia form inputs to the linear-reward-inaction algorithm.

24. A method comprising:

selecting at least a first switching threshold responsive to indications of a selected communication indicia associated with communication characteristics of a communication channel during a selected interval, the first switching threshold selected to at least satisfy a first performance criteria and to satisfy at least a second performance criteria, wherein the selecting the at least the first switching threshold comprises executing an algorithm at a processor, wherein the first communication station comprises the processor, wherein the algorithm comprises an enhanced linear-reward-inaction learning algorithm in which the selected communication indicia form inputs to the linear-reward-inaction algorithm;

selecting the modulation parameter by which the data is operated upon by the first communication station prior to transmission upon the communication channel;

changing the at least the first switching threshold responsive to changes in the indications of the selected communication indicia; and selectably changing the modulation parameter responsive to changes in the at least the first switching threshold.

25. The method of claim 24, wherein the inputs to the linear-reward-inaction algorithm comprise a first indication related to the first performance criteria and a second indication related to the second performance criteria.

* * * * *